United States Patent [19]

Kasahara

[11] Patent Number: 4,864,461

[45] Date of Patent: Sep. 5, 1989

[54] MACHINE UNIT HAVING RETAINING DEVICE USING STATIC ELECTRICITY

[75] Inventor: Keiji Kasahara, Kakegawa, Japan

[73] Assignee: Kabushiki Kaisha Abisare, Kakegawa, Japan

[21] Appl. No.: 180,484

[22] Filed: Apr. 12, 1988

Related U.S. Application Data

[63] Continuation-in-part of Ser. No. 84,447, Aug. 12, 1987, Pat. No. 4,751,609.

[30] Foreign Application Priority Data

Apr. 14, 1987 [JP] Japan .................................. 62-089848
Mar. 12, 1988 [JP] Japan .................................. 63-58904

[51] Int. Cl.⁴ ............................................. H02N 13/00
[52] U.S. Cl. .................................. 361/234; 271/18.1; 271/193
[58] Field of Search .............. 361/230, 231, 234, 232, 361/235; 271/18.1, 18.2, 193

[56] References Cited

U.S. PATENT DOCUMENTS

| | | | |
|---|---|---|---|
| 3,253,200 | 5/1966 | Klass et al. ............................. | 361/234 |
| 3,916,270 | 10/1975 | Wachtler et al. ..................... | 361/234 |
| 4,184,188 | 1/1980 | Briglia .................................... | 361/234 |
| 4,480,284 | 10/1984 | Tojo et al. .............................. | 361/234 |
| 4,526,357 | 7/1985 | Kuehnle et al. ................... | 271/193 X |
| 4,751,609 | 6/1988 | Kasahara ............................... | 361/234 |

FOREIGN PATENT DOCUMENTS

| | | | |
|---|---|---|---|
| 55-20830 | 6/1980 | Japan . | |
| 57-58872 | 12/1982 | Japan . | |
| 776977 | 11/1980 | U.S.S.R. ............................. | 271/18.1 |
| 1043298 | 9/1966 | United Kingdom ................ | 361/234 |

Primary Examiner—L. T. Hix
Assistant Examiner—Brian W. Brown
Attorney, Agent, or Firm—Flynn, Thiel, Boutell & Tanis

[57] ABSTRACT

A machine unit provided with an electrostatic retention means disposed at a desired position. The electrostatic retention means includes a pair of electrodes, an attraction member associated with the pair of electrodes and in which static electricity is induced so as to generate an electrostatic attraction force which attracts and retains an object, and a power source circuit for supplying positive and negative charges to the pair of electrodes while sequentially and alternately changing the polarity thereof.

9 Claims, 2 Drawing Sheets

MACHINE UNIT HAVING RETAINING DEVICE USING STATIC ELECTRICITY

CROSS-REFERENCE TO RELATED APPLICATION

This application is a continuation-in-part of my copending application Ser. No. 084,447 filed Aug. 12, 1987, now U.S. Pat. No. 4,751,609. The disclosure of Ser. No. 084,447 is incorporated herein by reference.

FIELD OF THE INVENTION

This invention relates to a machine unit having a retaining means using static electricity and, more particularly, to a machine unit having a retaining means capable of continuously and newly generating a large attraction force from a current supplied at a low voltage without being affected by temperature, humidity and other factors and capable of stably retaining an attracted object at a desired position on the machine unit.

A type of electrostatic retention means for attracting and retaining an object by using the Coulomb force of static electricity operates in such a manner that positive and negative charges are supplied to a pair of electrodes so as to induce static electricity in an attraction mechanism, and an object is attracted and retained by an electrostatic attraction force of this attraction mechanism. This type of electrostatic retention means has been applied to various machines or installations in various industrial fields. For example, it is used as an original holder portion of a copier or a portion of a conveyor system adapted to retain an object to be transported.

In this conventional electrostatic retention means, a current of constant polarity is continuously supplied to each of the pair of electrodes. As a current of constant polarity is continuously supplied in this manner, the ambient atmosphere around the attraction mechanism tends to be electrified so that the attraction force decreases if this electrostatic retention means operates for a long time. It is thus necessary to supply the current at a higher voltage (3,000 to 7,000 volts) in order to obtain a large attraction force.

The conventional electrostatic retention means also tends to be affected by temperature T, humidity H, and so forth, as shown in the attached table. In particular, the conventional retention means cannot stably retain the attracted object when the ambient temperature is low because the attraction force abruptly decreases if the temperature is reduced. The attached table shows results of an experiment in which a sheet of paper of A-4 size attracted to the surface of the attraction mechanism is drawn by a force applied parallel to this surface at an ambient temperature T (humidity H). Values shown in this table represents a force F required to start separation of the sheet of paper in this manner.

In addition, it is necessary for the conventional electrostatic retention means to be manufactured by carefully selecting specific materials in consideration of the electrical characteristics of the attraction mechanism in order to cope with the above-mentioned problems. The range of selection of materials is therefore narrow, and this increases the manufacturing cost.

If a conventional electrostatic retention means of the above-described type is provided in a machine unit such as a copier, it is difficult to optimize the functions of the machine unit since the retention means cannot stably attract and retain an object at a desired position.

It is therefore an object of the present invention to provide a machine unit having a retaining means which can continuously and newly generate a large attraction force from a current supplied at a low voltage without being affected by temperature, humidity and other factors, which can be manufactured at a lower cost by enabling a wide range of selection of materials, and which can stably attract and retain an object at a desired position in the machine unit, thereby optimizing the functions.

To this end, the present invention provides a machine unit provided with an electrostatic retention means disposed at a desired position, the electrostatic retention means having: a pair of electrodes; an attraction mechanism in which static electricity is induced so as to generate an electrostatic attraction force and which attracts and retains an object by this electrostatic attraction force; and a power source circuit for supplying positive and negative charges to the pair of electrodes while changing the polarity thereof.

In accordance with the present invention, the electrostatic retention means disposed at a desired position in a machine unit can continuously and newly generate a large attraction force while preventing reduction in the attraction force due to electrification of the ambient atmosphere or due to separation of an attracted object when the power supply circuit supplies positive and negative electric charges to the pair of electrode terminals while changing the polarity thereof. The attracted object can therefore be readily separated from a desired portion of the machine unit or can be securely and stably retained on a desired portion of the machine unit.

The present invention will be described below in detail with reference to the accompanying drawings with respect to embodiments thereof.

DETAILED DESCRIPTION

Figure 1:
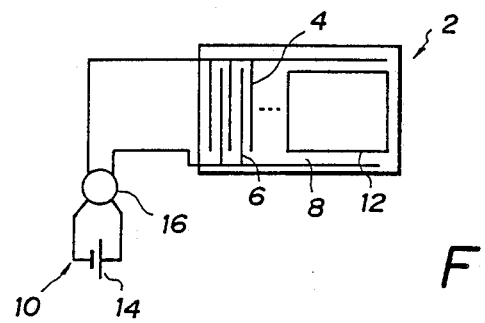
FIG. 1 is a plan view of an electrostatic retention means.

In FIG. 1, 2 denotes an electrostatic retention means, 4 and 6 denote electrodes, 8 denotes an attraction member, and 10 denotes a power source circuit. The pair of electrodes 4 and 6, for example, are comb shaped with the toothlike elements thereof being alternately disposed. These electrodes are supplied with charges from the power source circuit 10. An object 12 to be attracted is brought into contact with the attraction member 8 in which static electricity is induced by the pair of electrodes 4 and 6. Electric charges are thereby produced by electrostatic induction at portions of the object 12 which face the electrodes 4 and 6. These electric charges have polarities opposite to those of the corresponding electrodes. Electrostatic attraction occurs between the charges produced on the object 12 and the charges on the electrodes 4 and 6, thereby attracting the object 12 to the surface of the attraction member 8 so that the object 12 is retained thereon.

The power source circuit 10 supplies positive and negative electric charges to the pair of electrodes 4 and 6 while changing the polarity thereof. That is, positive charge is first supplied to the electrode 4 while negative charge is supplied to the electrode 6. The supply of charge is temporarily stopped and negative charge is thereafter supplied to the electrode 4 and positive charge is supplied to the electrode 6. Next, positive charge is again supplied to the electrode 4 while negative charge is again supplied to the electrode 6, as in the case of the first operation. The power source circuit 10 thus operates to supply alternately changing positive and negative charges to the electrodes 4 and 6. The power source circuit 10 is constituted by a power source 14 for supplying direct current (i.e. DC) power, and a changeover or switching means 16 for changing over the polarity of the DC power from the power source 14 so as to supply alternately changing positive and negative charges to the pair of electrodes 4 and 6.

In the electrostatic retention means 2, static electricity is induced in the attraction member 8, as positive and negative charges are supplied from the power source 14 to the electrodes 4 and 6 while the polarity of DC power from the power source 14 is changed by the changeover switch 16. When the object 12 is brought into contact with the attraction member 8, it is attracted and retained by an attraction force produced by electric charges of different polarities on the electrodes and the object.

It is thus possible to continuously and newly generate a large attraction force by supplying alternately changing positive and negative charges to the pair of electrodes 4 and 6 at a voltage (500 to 2,000 volts) lower than that needed by the conventional method. This operation can be performed without being affected by factors such as temperature and humidity while preventing reduction in the attraction force due to electrification of the ambient atmosphere or due to separation of the attracted object. It is therefore possible to stably retain at a desired position the object 12 attracted by a large attraction force continuously and newly supplied. The attraction force is not reduced even if this operation is continued for a long time in an environment in which there is a possibility of electrification of the ambient atmosphere, or if the operation is performed while changing the position of the attracted object 12 or replacing it with another object.

Therefore, the attracted object 12 can be retained securely and stably even if it is not flatly placed, that is, it is inclined or standing vertically. There is no need for a special material such as the one used by the conventional method to form the retaining means since a large attraction force is continuously and newly provided. Thus, the device in accordance with the present invention can be manufactured by selecting materials within a wide selection range and is therefore advantageous in terms of manufacturing cost.

It is thereby possible to optimize the performance of a machine or holding unit, various embodiments of which are shown in FIGS. 2 to 8, by applying thereto the electrostatic retention means 2 which is capable of stably retaining the object 12 at a desired position in the above described manner.

Figure 2:
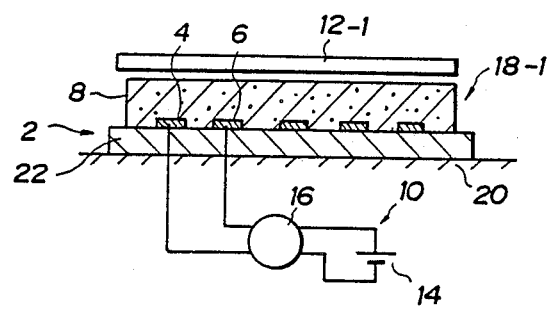
FIG. 2 is a cross-sectional view of an electrostatic chuck having an electrostatic retention means.

FIG. 2 shows an electrostatic chuck device 18-1 provided as a machine or holding unit. The electrostatic chuck device 18-1 is adapted to retain a semiconductor wafer 12-1 provided as the object 12 to be attracted, and the above-described electrostatic retention means 2 is applied to this device in such a manner that the electrodes 4 and 6 and the attraction member 8 are disposed on a base 20 at a desired position with an insulating layer 22 interposed therebeween. The semiconductor wafer 12-1 can be stably retained on the attraction member 8 by a large attraction force which is continuously and newly provided by supplying positive and negative charges from the power source circuit 10 to the electrodes 4 and 6 while sequentially changing the polarity thereof with elapse of time.

The thus constructed electrostatic chuck device 18-1 enables the semiconductor wafer 12-1 to be retained while the position thereof is determined with an improved accuracy, thereby reducing the number of resultant defective products.

Figure 3:
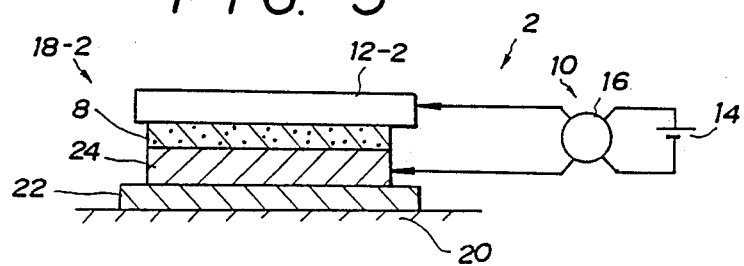
FIG. 3 is a cross-sectional view of another electrostatic chuck.

FIG. 3 shows another type of electrostatic chuck device 18-2 which is provided with a conductive member 24 disposed on the base 20 at a desired position with the insulating layer 22 interposed therebetween. The conductive member 24 serves as one of the pair of electrodes. A semiconductor wafer 12-2 provided as the object 12 to be attracted is used as the other one of the pair of electrodes.

The semiconductor wafer 12-2 can be directly retained more stably on the attracting member 8 by supplying positive and negative charges to the conductive member 24 and the semiconductor wafer 12-2 while changing the polarity thereof with elapse of time. In this case, the need for the provision of the comblike electrodes 4 and 6 is eliminated, thereby enabling simplification of the structure and a reduction in the manufacturing cost.

Figure 4:
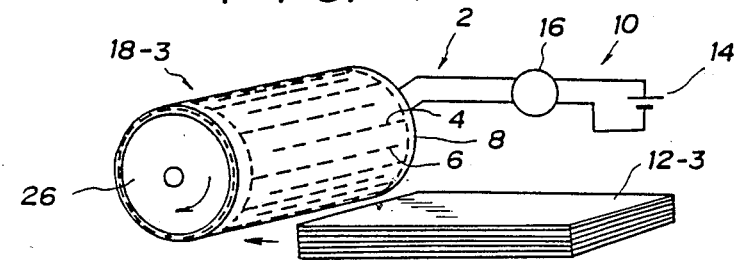
FIG. 4 is a perspective view of an electrostatic paper feeding device having an electrostatic retention means.

FIG. 4 shows an electrostatic paper feeding device 18-3 provided as a machine unit. The electrostatic paper feeding device 18-3 is adpated to retain and feed a sheet of paper 12-3 provided as the object 12 to be attracted, and the electrostatic retention means 2 is applied to this device in such a manner that the electrodes 4 and 6 and the attraction member 8 are disposed around the surface of a rotatable feed roller 26 of the electrostatic paper feeding device 18-3. The sheet of paper 12-3 can be stably retained on the feed roller 26 and positively fed by virtue of a large attraction force which is continuously and newly provided by supplying positive and negative charges from the power source circuit 10 to the electrodes 4 and 6 while sequentially reversing the polarity thereof.

Figure 5:
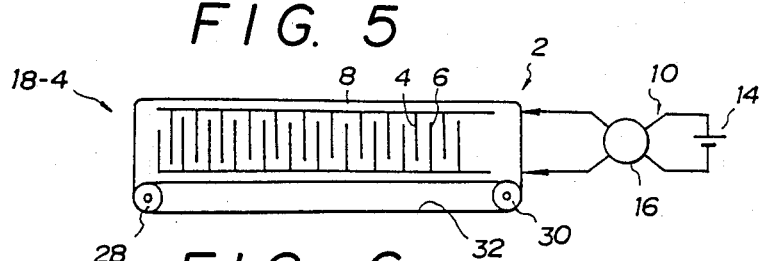
FIGS. 5 and 6 are a perspective view and a side view of an electrostatic conveyor having an electrostatic retention means.
Figure 6:
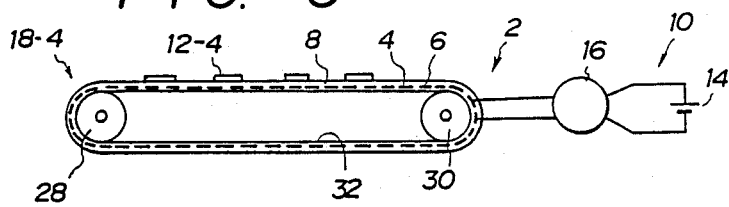

FIGS. 5 and 6 show an electrostatic conveyor 18-4 provided as a machine unit. The electrostatic paper feeding device 18-4 is adpated to retain and transport a transportation object 12-4 provided as the object 12 to be attracted, and the electrostatic retention means 2 is applied to this conveyor in such a manner that the electrodes 4 and 6 and the attraction member 8 are disposed on a conveyor belt 32 stretched between a pair of rollers 28 and 30. The transportation object 12-4 can be stably retained on the conveyor belt 32 and positively transported by virtue of a large attraction force which is continuously and newly provided by supplying positive and negative charges from the power source circuit 10 to the electrodes 4 and 6 while sequentially reversing the polarity thereof.

In the embodiments of FIGS. 4 and 5-6, the electrodes 4 and 6 are preferably of a comblike configuration with the electrodes being disposed in opposed and interfitting relationship, whereby the teethlike elements of the electrodes hence extend transversely (that is, axially) relative to the roller 26 (FIG. 4) or belt 32 (FIGS. 5-6). The electrical charge can be supplied to the electrodes from the power source circuit 10 by conventional means, such as conventional relatively-slidable electrical contacts associated with the roller or belt.

Figure 7:
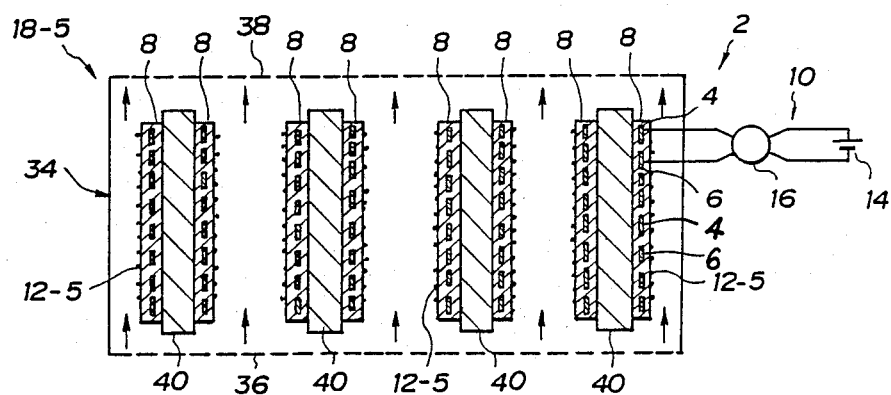
FIG. 7 is a cross-sectional view of an electrostatic cleaner having an electrostatic retention means.

FIG. 7 shows an electrostatic cleaner 18-5 provided as a machine unit. The electrostatic cleaner 18-5 is adapted to attract and remove very small objects or particles 12-5 in the air such as particles of cement, bacteria, or dust disposed as the object 12 to be attracted. The electrostatic retention means 2 is applied to this device in such a manner that the electrodes 4 and 6 and the attraction member 8 are disposed on both sides of support members 40 made of an insulating material and arranged in parallel so as to extend from an inlet section 36 to an outlet section 38 in the direction in which air flows through a main body or housing 34 of static cleaner 18-5. The attraction members 8 are directly supported on the main body 34 thereinside. The electrostatic cleaner 18-6 has a simple structure and can therefore be manufactured at a low cost, but it can positively remove very small objects 12-6.

Figure 8:
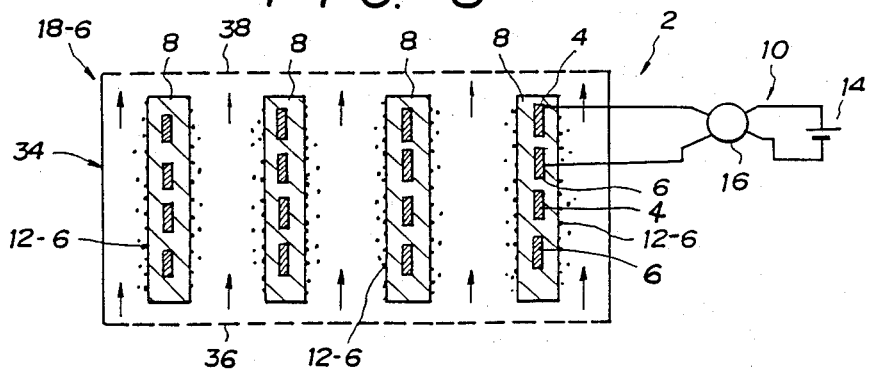
FIG. 8 is a cross-sectional view of another electrostatic cleaner.

In the embodiments of FIGS. 7 and 8, the electrodes 4 and 6 preferably have a plurality of elongate electrode parts which extend generally parallel with each other in a spaced relationship. The electrodes 4 and 6 are disposed such that their respective elongate parts are in an interposed relationship extending generally parallel with each other and generally perpendicular to the direction of the air flow path.

In the case of the electrostatic cleaner 18-5 shown in FIG. 7, the time period with which the polarity of the positive and negative charges supplied to the pair of electrodes 4 and 6 is changed is set at 15 minutes. However, it is preferable to select a desired length of the period in the order of seconds, minutes or hours depending upon conditions of the ambient atmosphere such as temperature and humidity and/or other conditions including the material used to form the attraction member 8.

TABLE

| | Conventional unit A | | Conventional unit B | | Unit of the invention | |
|---|---|---|---|---|---|---|
| | Ambient temperature T (humidity H) | Force F at the time of separation | Ambient temperature T (humidity H) | Force at the time of separation | Ambient temperature T (humidity H) | Force at the time of separation |
| 1 | 20° C. (65%) | 4.5 kg | 20° C. (65%) | 3.8 kg | 20° C. (65%) | 6.5 kg |
| 2 | 20° C. (65%) | 4.7 kg | 20° C. (65%) | 4.0 kg | 20° C. (65%) | 5.8 kg |
| 3 | 20° C. (65%) | 4.3 kg | 20° C. (65%) | 4.2 kg | 20° C. (65%) | 7.5 kg |
| 4 | 20° C. (65%) | 4.4 kg | 20° C. (65%) | 4.1 kg | 20° C. (65%) | 6.8 kg |
| 5 | 20° C. (65%) | 4.3 kg | 20° C. (65%) | 3.9 kg | 20° C. (65%) | 6.9 kg |
| 6 | −6° C. | 3.8 kg | −6° C. | 0.5 kg | −6° C. | 3.8 kg |
| 7 | −6° C. | 2.1 kg | −6° C. | 0.6 kg | −6° C. | 3.8 kg |
| 8 | −6° C. | 1.3 kg | −6° C. | 0.4 kg | −6° C. | 3.5 kg |
| 9 | −6° C. | 1.0 kg | −6° C. | 0.5 kg | −6° C. | 3.9 kg |
| 10 | −6° C. | 0.5 kg | −6° C. | 0.5 kg | −6° C. | 3.7 kg | the electrostatic cleaner 18-5. The cleaner 18-5 can positively attract and remove very small objects 12-5 from the air flowing from the inlet section 36 on one side of the housing 34 to the outlet section 38 on the other side of the housing 34 by virtue of a large attraction force which is continuously and newly provided by supplying positive and negative charges from the power source circuit 10 to the electrodes 4 and 6 while changing the polarity thereof at predetermined periods of time, e.g., 15 minute time intervals. The supply of electric charge to the electrodes 4 and 6 may be interrupted for a certain period of time so as to eliminate the attraction force, thereby enabling the attraction members to be cleaned by removing small objects attracted and retained thereon.

FIG. 8 shows another type of electrostatic cleaner 18-6. Positive and negative charges are supplied from the power source circuit 10 to the electrodes 4 and 6 while periodically changing the polarity thereof. Since the range of selection of each material for forming the electrostatic retention means 2 in accordance with the present invention is wide, the attraction member 8 can be formed from a material capable of providing a high degree of rigidity. It is therefore possible to eliminate the support members 40 associated with the electro- In accordance with the present invention, as described above, the electrostatic retention means disposed at a desired position in a machine unit can continuously and newly generate a large attraction force while preventing reduction in the attraction force due to electrification of the ambient atmosphere or due to a reduction in the amount of static electricity on the attraction member caused by separation of the attracted object because the power supply circuit supplies positive and negative electric charges to the pair of electrode terminals while sequentially changing the polarity thereof at selected time intervals.

As shown in the attached table, the device in accordance with the present invention can generate a large attraction force compared with the conventional device even at a low ambient temperature without being influenced by temperature and humidity.

It is thus possible to stably attract and retain an object at a desired position in the machine unit by a current supplied at a low voltage, by continuously and newly generating a large attraction force. There is no need for manufacturing the device in accordance with the present invention from a special material as in the case of the conventional device. The range of selection of materials in accordance with the present invention is wide, which is preferable in terms of manufacturing cost.

The functions of the machine unit having this electrostatic retention means can be optimized by enabling the attracted object to be retained at a desired position in the above-described manner.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a machine unit having electrostatic holding means for retaining an object by electrostatic attraction force, said electrostatic holding unit including: a pair of electrodes; an attraction member in which static electricity is induced by said electrodes so as to generate an electrostatic attraction force which attracts and retains an object by said electrostatic attraction force; a power source circuit for supplying positive and negative charges to said pair of electrodes while changing the polarity thereof, said power source circuit including a DC power source having first and second terminals, electrically conductive means connected between said first and second terminals and said pair of electrodes, and switching means associated with said conductive means for selectively permitting said first and second terminals to be alternately and oppositely connected to said pair of electrodes in a predetermined time sequence for alternately reversing the electrical polarity of the electrodes; a support base; a conductive member interposed between said attraction member and said support base, said conductive member functioning as one of said electrodes; an insulative layer interposed between said conductive member and said support base; and said object comprising a semiconductor wafer functioning as the other of said electrodes.

2. In a machine unit having electrostatic holding means for retaining an object by electrostatic attraction force, said electrostatic holding unit including: a pair of electrodes; an attraction member in which static electricity is induced by said electrodes so as to generate an electrostatic attraction force which attracts and retains an object by said electrostatic attraction force; a power source circuit for supplying positive and negative charges to said pair of electrodes while changing the polarity thereof, said power source circuit including a DC power source having first and second terminals, electrically conductive means connected between said first and second terminals and said pair of electrodes, and switching means associated with said conductive means for selectively permitting said first and second terminals to be alternately and oppositely connected to said pair of electrodes in a predetermined time sequence for alternately reversing the electrical polarity of the electrodes; a rotatable roller having said attraction member extending around the peripheral surface thereof; and said electrodes being associated with said attraction member for enabling the object to be electrostatically attracted to the exposed surface of said attraction member.

3. A unit according to claim 2, wherein the electrodes of said pair are of a comblike configuration disposed in generally opposed and interfitting relationship, the electrodes having generally toothlike portions which project from the respective electrode in a direction generally toward the other electrode with said toothlike portions extending generally axially of said roller.

4. In a machine unit having electrostatic holding means for retaining an object by electrostatic attraction force, said electrostatic holding unit including: a pair of electrodes; an attraction member in which static electricity is induced by said electrodes so as to generate an electrostatic attraction force which attracts and retains an object by said electrostatic attraction force; a power source circuit for supplying positive and negative charges to said pair of electrodes while changing the polarity thereof, said power source circuit including a DC power source having first and second terminals, electrically conductive means connected between said first and second terminals and said pair of electrodes, and switching means associated with said conductive means for selectively permitting said first and second terminals to be alternately and oppositely connected to said pair of electrodes in a predetermined time sequence for alternately reversing the electrical polarity of the electrodes; a pair of spaced rotatable rollers having an endless conveyor belt supported on and extending between said pair of rollers; said attraction member defining the outer surface of said conveyor belt; and said pair of electrodes being mounted on said conveyor belt in association with said attraction member.

5. A unit according to claim 4, wherein the electrodes of said pair are of a comblike configuration disposed in generally opposed and interfitting relationship, the electrodes having generally toothlike portions which project from the respective electrode in a direction generally toward the other electrode with said toothlike portions extending generally transversely across said belt.

6. In a machine unit having electrostatic holding means for retaining an object by electrostatic attraction force, said electrostatic holding unit including: a pair of electrodes; an attraction member in which static electricity is induced by said electrodes so as to generate an electrostatic attraction force which attracts and retains an object by said electrostatic attraction force; a power source circuit for supplying positive and negative charges to said pair of electrodes while changing the polarity thereof, said power source circuit including a DC power source having first and second terminals, electrically conductive means connected between said first and second terminals and said pair of electrodes, and switching means associated with said conductive means for selectively permitting said first and second terminals to be alternately and oppositely connected to said pair of electrodes in a predetermined time sequence for alternately reversing the electrical polarity of the electrodes; a housing having an air inlet on one side thereof and an air outlet on the other side thereof, said housing defining a flow path therethrough from said air inlet to said air outlet; said electrostatic holding means being associated with said flow path for removing objects from the air flowing therethrough; said attraction member being a platelike member disposed within said path and oriented so as to extend generally in a direction parallel with said path; and said pair of electrodes being mounted on said platelike member.

7. A unit according to claim 6, wherein one said electrode has a plurality of elongate electrode parts which extend generally parallel with one another in spaced relationship and are elongated generally perpendicularly with respect to the flow direction of said path, and wherein the other electrode of said pair has elongate electrode parts which are generally parallel with and interposed between the elongate electrode parts of said one electrode.

8. A unit according to claim 7, wherein the electrostatic holding means includes a plurality of said attraction members disposed in sidewardly spaced and generally parallel relationship so as to permit flow of air therebetween, each said attraction member having a pair of said electrodes associated therewith.

9. A unit according to claim 7, including a platelike support member of an insulating material disposed within said path and having a pair of said attraction members secured thereto on opposite sides thereof, each said attraction member having a pair of said electrodes associated therewith.

* * * * *